(12) United States Patent
Battaglia et al.

(10) Patent No.: US 9,776,466 B2
(45) Date of Patent: Oct. 3, 2017

(54) MOTOR-VEHICLE WHEEL SUSPENSION, WITH A TOE ANGLE REGULATING DEVICE

(71) Applicant: FCA Italy S.p.A., Turin (IT)

(72) Inventors: Gaetano Battaglia, Verolengo (IT); Luca Dusini, Modena (IT)

(73) Assignee: FCA Italy S.p.A. (IT)

( * ) Notice: Subject to any disclaimer, the term of this patent is extended or adjusted under 35 U.S.C. 154(b) by 0 days.

(21) Appl. No.: 15/206,442

(22) Filed: Jul. 11, 2016

(65) Prior Publication Data
US 2017/0015173 A1    Jan. 19, 2017

(30) Foreign Application Priority Data

Jul. 14, 2015  (IT) .................. 102015000034111

(51) Int. Cl.
*B62D 17/00* (2006.01)
*B60G 15/06* (2006.01)
(Continued)

(52) U.S. Cl.
CPC ............. *B60G 15/067* (2013.01); *B60G 3/18* (2013.01); *B60G 3/20* (2013.01); *B60G 7/001* (2013.01);
(Continued)

(58) Field of Classification Search
CPC ........ B60G 15/067; B60G 7/02; B60G 7/001; B60G 3/18; B60G 3/20; B60G 2200/17;
(Continued)

(56) References Cited

U.S. PATENT DOCUMENTS

| | | |
|---|---|---|
| 3,880,444 A | 4/1975 | Bridges |
| 4,267,896 A | 5/1981 | Hendriksen |

(Continued)

FOREIGN PATENT DOCUMENTS

| | | |
|---|---|---|
| DE | 102011055704 A1 | 5/2013 |
| EP | 1870263 A2 | 12/2007 |

(Continued)

OTHER PUBLICATIONS

Italian Search Report for corresponding Italian Application No. 102015000034111 (IT UB20152142) completed on Mar. 7, 2016.

*Primary Examiner* — Drew J Brown
(74) *Attorney, Agent, or Firm* — Heslin Rothenberg Farley & Mesiti, P.C.; Victor Cardona, Esq.

(57) ABSTRACT

A motor-vehicle wheel suspension includes a lower oscillating arm, a damper unit, an upper oscillating rod and a vertical articulated rod. The suspension includes a toe control oscillating rod having an inner end pivotally connected to a supporting structure and an outer end pivotally connected to a wheel support. An articulation of the outer end of the toe control rod to the wheel support and the upper end of the vertical rod includes an articulation axle connected to the vertical rod. An eccentric cylindrical member is rotatably mounted on the articulation axle within a cylindrical cavity in the support and has an axis eccentric relative to the articulation axle. The articulation axle is connected to an adjustment ring, whose rotation determines a variation in the position of the wheel support and a resulting variation of the wheel toe angle.

6 Claims, 8 Drawing Sheets

(51) Int. Cl.
*B60G 3/20* (2006.01)
*B60G 3/18* (2006.01)
*B60G 7/00* (2006.01)
*B60G 7/02* (2006.01)

(52) U.S. Cl.
CPC ............... *B60G 7/02* (2013.01); *B62D 17/00* (2013.01); *B60G 2200/17* (2013.01); *B60G 2200/184* (2013.01); *B60G 2200/4622* (2013.01); *B60G 2204/129* (2013.01); *B60G 2204/148* (2013.01); *B60G 2204/4222* (2013.01); *B60G 2206/12* (2013.01); *B60G 2206/121* (2013.01)

(58) Field of Classification Search
CPC ...... B60G 2204/148; B60G 2204/4222; B60G 2204/129; B60G 2206/121; B60G 2200/184; B60G 2200/4622; B60G 2206/12; B62D 17/00
See application file for complete search history.

(56) References Cited

U.S. PATENT DOCUMENTS

| | | | | |
|---|---|---|---|---|
| 5,129,669 | A * | 7/1992 | Specktor | B60G 11/28 280/86.753 |
| 2005/0062248 | A1* | 3/2005 | Winkler | B60G 3/20 280/86.758 |
| 2007/0080509 | A1* | 4/2007 | Kim | B60G 7/006 280/5.52 |
| 2011/0221155 | A1 | 9/2011 | Schote | |
| 2011/0233880 | A1* | 9/2011 | Lee | B60G 7/006 280/5.5 |
| 2015/0084300 | A1* | 3/2015 | Hopson | B62D 17/00 280/93.512 |

FOREIGN PATENT DOCUMENTS

| | | |
|---|---|---|
| EP | 1870263 A3 | 5/2008 |
| FR | 2982531 A1 | 5/2013 |
| WO | 2013/075787 A1 | 5/2013 |

* cited by examiner

MOTOR-VEHICLE WHEEL SUSPENSION, WITH A TOE ANGLE REGULATING DEVICE

CROSS-REFERENCE TO RELATED APPLICATION

This application claims priority from Italian patent application No. 102015000034111 filed on Jul. 14, 2015, the entire disclosure of which is incorporated herein by reference.

FIELD OF THE INVENTION

The present invention relates to a motor-vehicle wheel suspension, in particular a rear suspension, of the type comprising a wheel support connected to a motor-vehicle supporting structure by at least the following connecting elements:

- a lower oscillating arm, having an inner end pivotally connected to said supporting structure around a first articulation axis and an outer end pivotally connected to the wheel support around a second articulation axis,
- a damper unit having a lower end pivotally connected to the lower oscillating arm around a third articulation axis, and an upper end swivelly connected to the motor-vehicle structure,
- an upper oscillating rod for camber control, having opposite ends articulated to the supporting structure and the wheel support around a fourth and a fifth articulation axis, respectively,
- a vertical articulated rod having an upper end pivotally connected to the wheel support around a sixth articulation axis and a lower end pivotally connected to the outer end of the lower oscillating arm.

An oscillating toe rod for toe control which has an inner end pivotally connected to said supporting structure around a seventh articulation axis and an outer end which is pivotally connected to the wheels support.

Suspensions of the above indicated type have been known which are provided with a device for regulating the toe angle. In these known solutions, however, the regulation of the toe angle is obtained by altering the geometry of the suspension and in particular by modifying the relative positions of the Kinematic points defining the geometry of the suspension. The variation of the toe angle during the vertical movement of the suspension is consequently altered, this variation being a function of the position and the length of the above mentioned toe rod for toe control.

OBJECT OF THE INVENTION

The object of the present invention is that of overcoming the above indicated drawback, by providing a suspension in which the wheel toe angle can be regulated by simple and fast operations, and in which a regulation of the toe angle does not alter the variation of the toe angle during the vertical movements of the suspension.

A further object of the invention is that of providing a rear suspension of the above indicated type, and having a reduced bulk, above all along the longitudinal direction of the motor-vehicle, so as to increase the space available for the vehicle rear seats, particularly along a direction transverse relative to the above mentioned longitudinal direction.

SUMMARY OF THE INVENTION

In view of achieving the above indicated object, the present invention provides a motor-vehicle wheel suspension having all the features which have been indicated at the beginning of the present description and further characterized in that:

- the lower end of the vertical rod is pivotally connected to the outer end of the lower oscillating arm around said third articulation axis, around which the lower end of the damper unit is also articulated,
- the outer end of said toe rod is pivotally connected to the wheel support around said sixth articulation axis, around which the upper end of said vertical rod is also articulated,
- the articulation of the outer end of said toe rod to the wheel support and to the upper end of said vertical rod comprises:
  - an articulation axle rigidly connected to said upper end of the vertical rod and projecting axially in a cantilever fashion therefrom,
  - a cylindrical cavity formed in the outer end of said toe rod which rotatably receives therein said articulation axle, for articulation of said toe rod around said articulation axle,
  - an eccentric cylindrical member, rigidly connected to said articulation axle and rotatably mounted within a cylindrical cavity formed in said wheel support and having an axis which is eccentric with respect to said articulation axle, and
  - an adjustment ring rigidly connected to said articulation axle,
  in such a way that an angular adjustment of said ring determines a change of position of the wheel support which causes a variation of the toe angle of the wheel, without modifying the position of said seventh articulation axis of the toe rod to the supporting structure and without modifying the distance between said sixth and seventh axes around which the opposite ends of said toe rod are articulated.

Due to the above indicated features, in the suspension according to the invention the wheel toe angle can be modified without altering the relative positions of the suspension Kinematic points defining the geometry of the suspension, which ensures that the variation of the toe angle during the vertical movements of the suspension is always kept unaltered.

DESCRIPTION OF A PREFERRED EMBODIMENT

Further features and advantages of the invention will become apparent from the description which follows with reference to the annexed drawings, given purely by way of non-limiting example, in which:

FIGS. 1, 2 are two perspective views of a preferred embodiment of the suspension according to the invention, FIG. 3 is an exploded perspective view of the suspension of FIGS. 1, 2, FIG. 4 is a view from above of one part of the suspension according to the invention, FIGS. 5A, 5B, 5C are perspective views which show three different operating conditions of the toe angle regulating device provided in the suspension according to the invention, FIG. 6 is a further perspective view and at an enlarged scale, of the suspension of FIGS. 1, 2, FIG. 7 is a perspective view and at an enlarged scale of a detail of the toe angle regulating device, FIG. 8 shows a further detail of the suspension according to the invention, and FIGS. 9, 10 are two diagrams showing a known suspension and demonstrating the drawback which is overcome by the suspension according to the invention.

With reference initially to FIGS. 1-3 and 6, numeral 1 generally designates a suspension for a motor-vehicle left rear wheel, comprising a wheel support K connected by a plurality of connecting elements to a supporting structure constituted by an auxiliary frame F which is to be assembled under the body of a motor-vehicle, In the specific illustrated example, the auxiliary frame F comprises a quadrangular structure defined by two cross-members F1, F2 connected to each other by two longitudinal arms L1, L2 (see FIG. 3). At the four apices of the above described structure, frame F comprises four connecting brackets S carrying elastic supports for connection to the motor-vehicle body.

A first connecting element between each support K and the frame F is constituted by a lower oscillating arm or wishbone W. Arm W has an inner end carrying two connecting portions W1, W2 which, in the specific illustrated case, carry elastic bushings for the articulated connection to frame F around first articulation axes I. At its outer end, each arm W has a connecting portion W3 for articulated connection around an axis II to a connecting portion K1 of the wheel support K, the connecting portion W3 carrying an elastic bushing.

A further connecting element between each wheel support K and the vehicle structure is constituted by a cylinder damper D having a lower end D1 which is pivotally connected to a connecting portion W4 carried by the respective lower oscillating arm W, around an articulation axis III. The upper end of the damper unit D is to be swivelly connected, according to a technique known per se, within a support (not shown) forming part of the motor-vehicle structure.

Each wheel support K is further connected to the frame F by an upper oscillating rod for camber control C having opposite ends C1,C2 pivotally connected to the frame F and the wheel support K respectively. To this end, the support K includes a connecting portion K2, whereas the frame F includes a connecting portion F3. The articulation axes of the opposite ends of each rod C for camber control are respectively designated by IV and V.

Reference R designates a short vertical rod having an upper end R1 pivotally connected to a connecting portion K3 at the end of an arm forming part of support K and a lower end pivotally connected to the connecting portion W4 of the lower arm W, around the same axis III around which the lower end of the damper unit D is articulated. The articulation axis of the upper end of the vertical rod R is designated by VI.

Suspension 1 further comprises an oscillating toe rod T for toe control. As better shown in FIG. 4 the toe control rod T has an inner end T1 pivotally connected to a connecting portion F4 of a frame F around an axis VII. The outer end T2 of the toe control rod T is instead pivotally connected around axis VI both to the connecting portion K3 of support K, and to the upper end R1 of the vertical rod R.

The suspension is completed by a helical spring H having a lower end supported by the lower oscillating arm W (in a position spaced apart from the damper unit D) and an upper end which is to engage a support of the motor-vehicle structure (not shown). The suspension further comprises a torsion bar TR rotatably supported around an axis transverse with respect to the longitudinal direction of the motor-vehicle by supports TR1 carried by the frame F (see FIGS. 1, 2). As better visible in FIGS. 1, 2, the torsion bar TR has end arms each connected to the respective lower oscillating arm W with the interposition of a connecting rod B whose ends are respectively articulated to one end of the torsion bar TR and the lower oscillating arm W.

With reference again to FIG. 4, as well as to FIGS. 5A, 5B, 5C and 7, 8, the articulation of the outer end T2 of the toe control rod T to the connecting portion K3 of a support K and the upper end R1 of the vertical rod R comprises an articulation axle 60 which is rigidly connected to the upper end R1 (see FIG. 8) of the vertical rod R. The articulation axle 60, whose axis defines the above mentioned articulation axis VI, projects axially in a cantilever fashion from the upper end R1 of the vertical rod R.

The outer end T2 of the toe control rod T is pivotally mounted on the articulation axle 60 by having a cylindrical through hole T21 which rotatably receives the axle 60. As better visible in FIG. 7, on axle 60 an eccentric cylindrical member 61 is also rigidly connected. The cylindrical member 61 is rotatably mounted within a cylindrical cavity K31 formed in the connecting portion K3 of support K. The cylindrical member 61 and the cylindrical cavity K31 in which it is rotatably received have a common axis which is eccentric with respect to axis VI of the articulation axle 60.

As visible in FIG. 7, on axle 60 an adjustment ring G is also rigidly connected, for regulating the toe angle. The free end of the axle 60 finally has a threaded portion on which a locking nut N is engaged (see for instance FIG. 6).

FIG. 5B show the condition in which the axis of the eccentric cylindrical member 61 is aligned vertically below axis VI of the articulation axle 6. In an actual embodiment, in this condition the toe angle of the wheel corresponds to a predetermined design value.

Figure 5C:
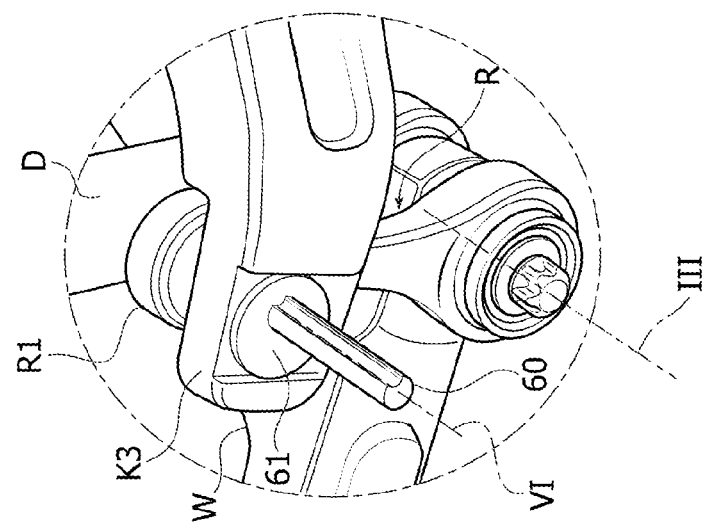
FIGS. 5A, 5B, 5C show three different operative positions of the device for regulating the toe angle.
Figure 5B:
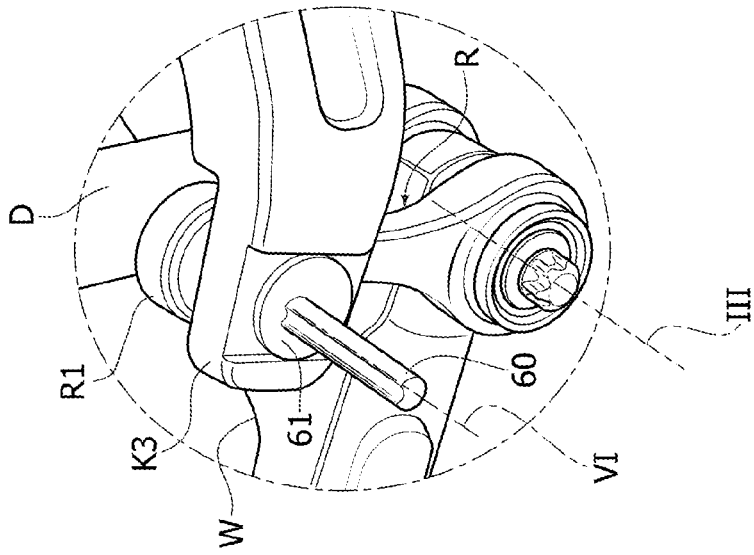
Figure 5A:
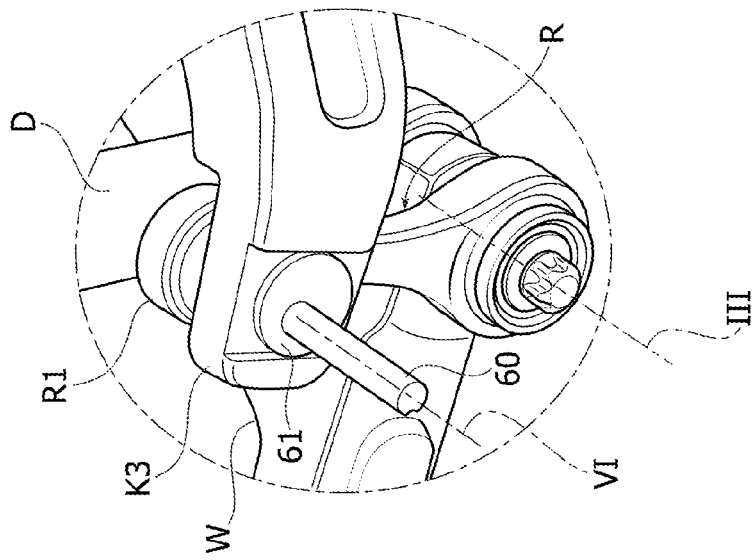
Figure 6:
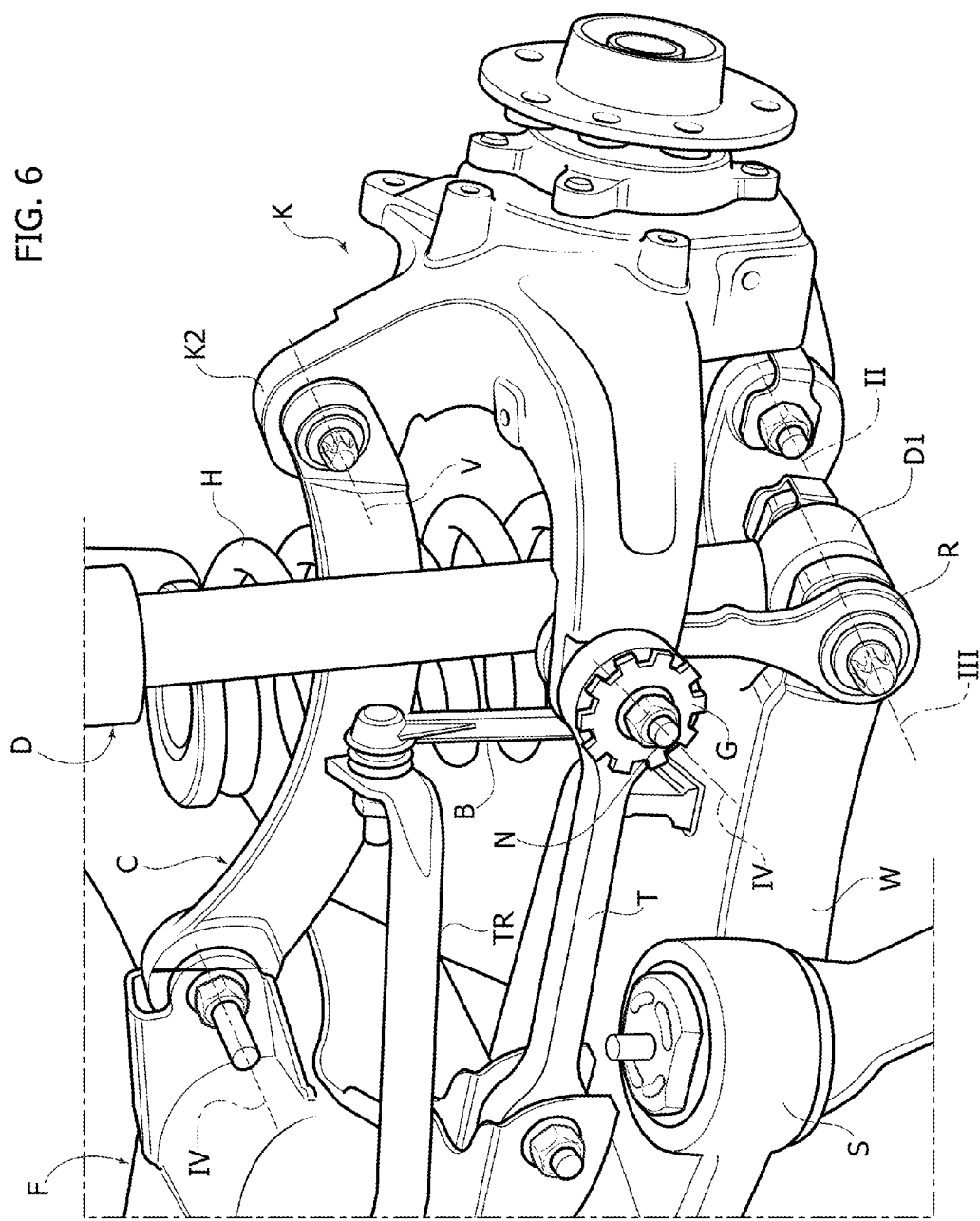
Figure 7:
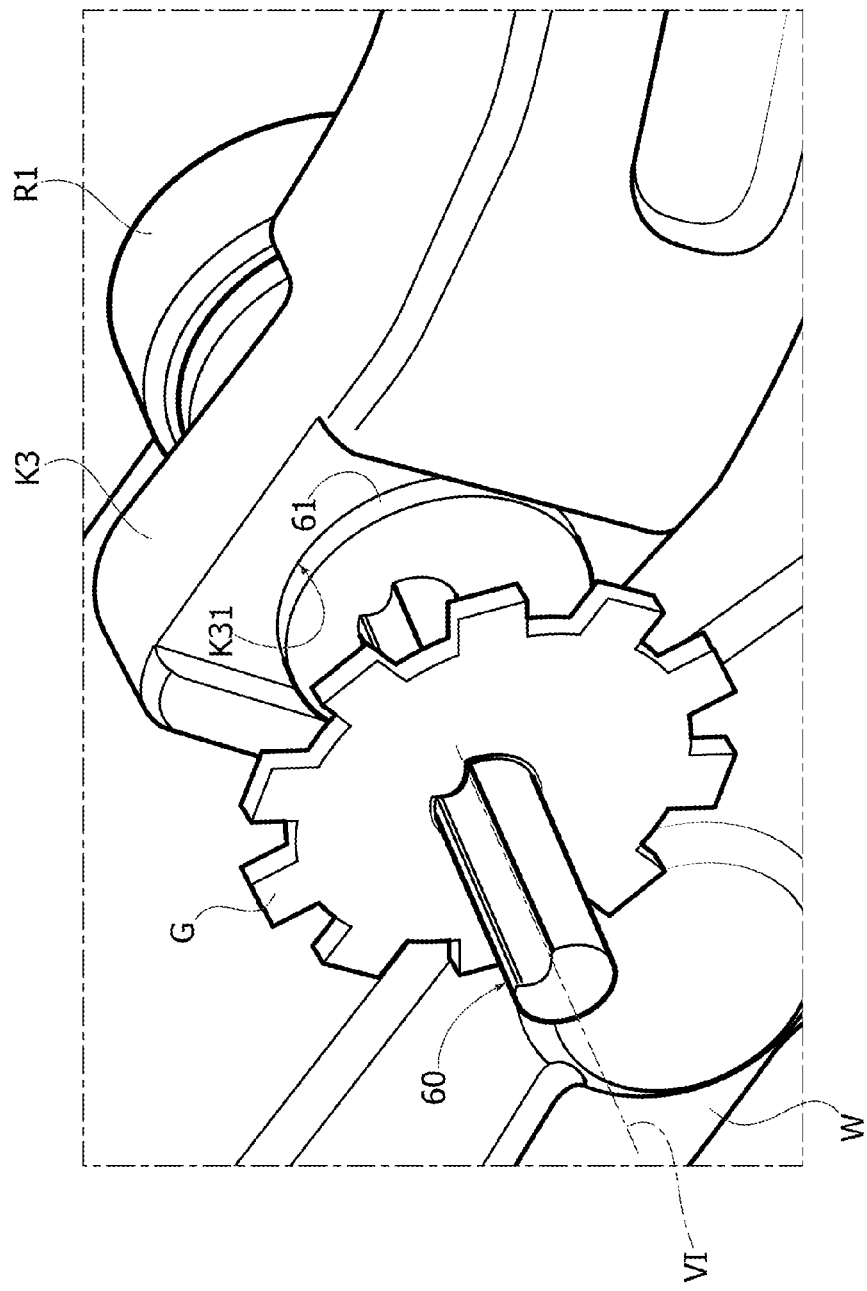

FIGS. 5A and 5C show the conditions in which the adjustment ring G has been rotated in one direction or the other starting from the position shown in FIG. 5B, in order to bring the axis of the eccentric cylindrical member 61 on one side or the other with respect to axis VI of axle 60. In each of these two cases, the rotation of ring G causes a rotation of axle 60 and a resulting rotation of the eccentric member 61 with respect to the cylindrical cavity K31 of support K. Since axle 60 is rigidly connected to the upper end R1 of the vertical rod R, a rotation of the eccentric member 61 within its seat corresponds according to a biunivocal relationship to a different position of the vertical rod R. In any case, the rotation imparted to the adjustment ring G is translated into a displacement in space of the connecting portion K3 of support K, which gives rise to a variation of the wheel toe angle, in one direction or the other, with respect to the predetermined value set in the condition of FIG. 5B.

The main advantage of the invention lies in that the above mentioned adjustment of the toe angle is obtained without modifying the operative length of the toe control rod T and/or without displacing rod T. In other words, the axis VII of the articulation of the inner end T1 of rod T on frame F remains always in the same position, and the axis VI of the articulation of the outer end T2 of rod T on axle 60 always remains at the same distance from axis VII. Therefore, the regulation of the toe angle is obtained without altering the geometry of the suspension and in particular without modifying the position of the suspension Kinematic points. This characteristic provides an important advantage, in that in this manner the toe angle variation during the vertical movements of the suspension remains unaltered.

Figure 9:
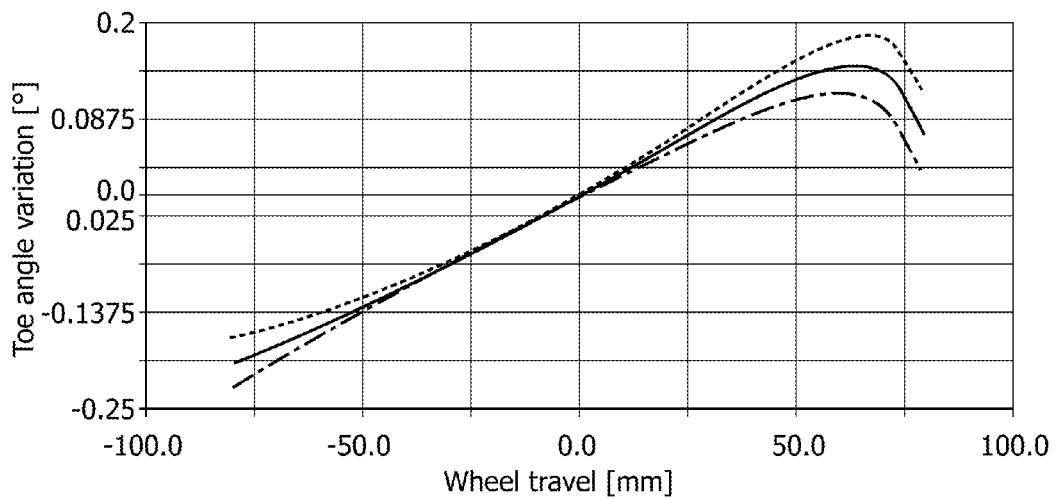
Figure 10:
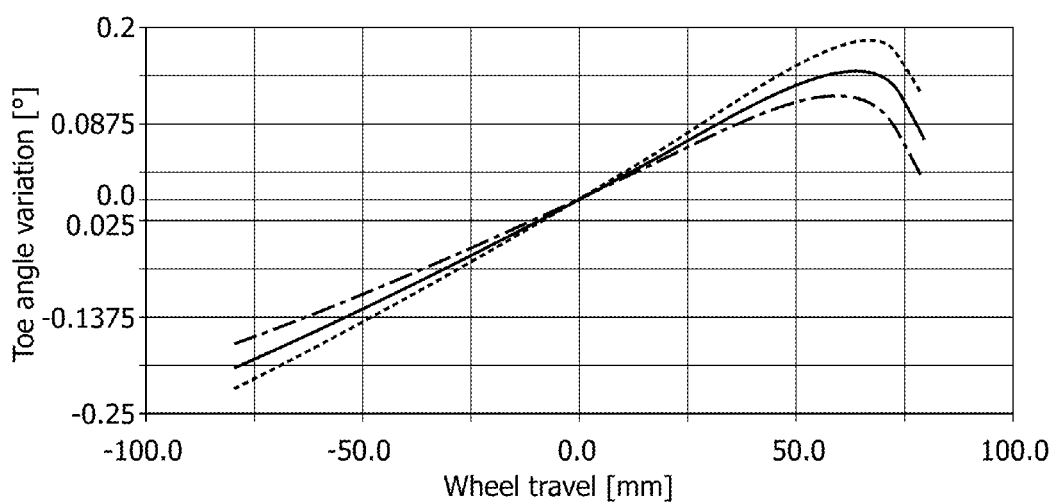

The diagrams of FIGS. 9, 10 show the behaviour of known suspensions which are not provided with the device of the invention for regulating the toe angle. FIG. 9 shows the case of a suspension in which which the toe angle is set by providing a toe control rod of adjustable length. FIG. 10 shows the behaviour of a suspension in which the toe angle is regulated by causing a displacement of the toe control rod. In each diagram, the undotted line shows the variation of the toe angle as a function of the vertical movement of the wheel according to a theoretical design condition. The dotted line and the dash-and-dot line show the variation of the toe angle which takes place after a positive or negative regulation of the toe angle, respectively. It can be immediately noted that following a regulation of the toe angle obtained with the known devices, the variation of the toe angle is kept substantially unaltered only in proximity of the zero position of the wheel, whereas as soon as the wheel moves vertically upwardly or downwardly from the zero position, the toe angle variation changes considerably. In the case of the device of the invention, the diagram of the variation of the toe angle remains instead always the ideal one, even after an adjustment of the toe angle. As indicated, this result is achieved because the variation of the toe angle is obtained without altering the geometry of the suspension.

Figure 2:
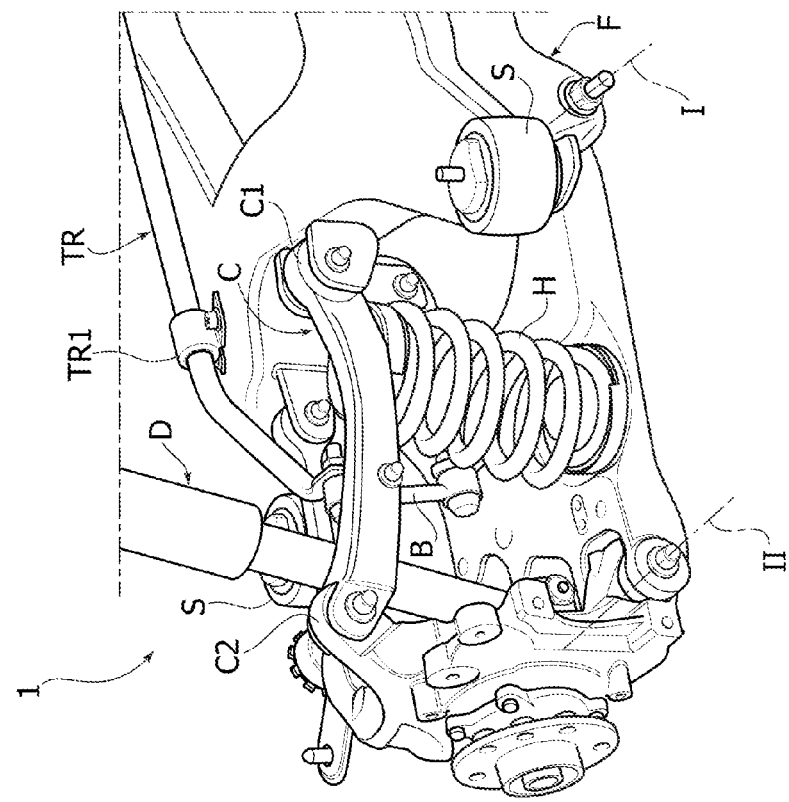
Figure 1:
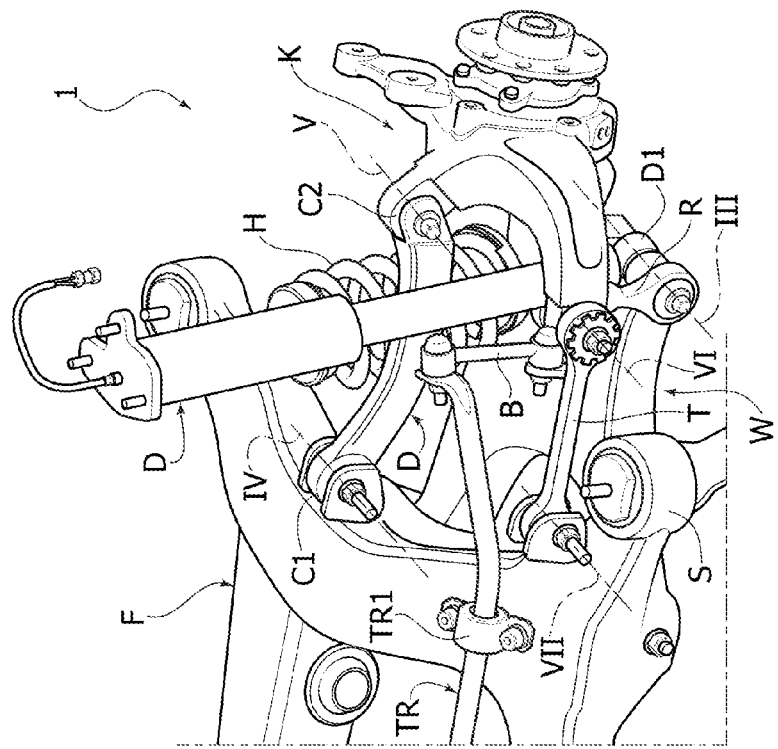
Figure 3:
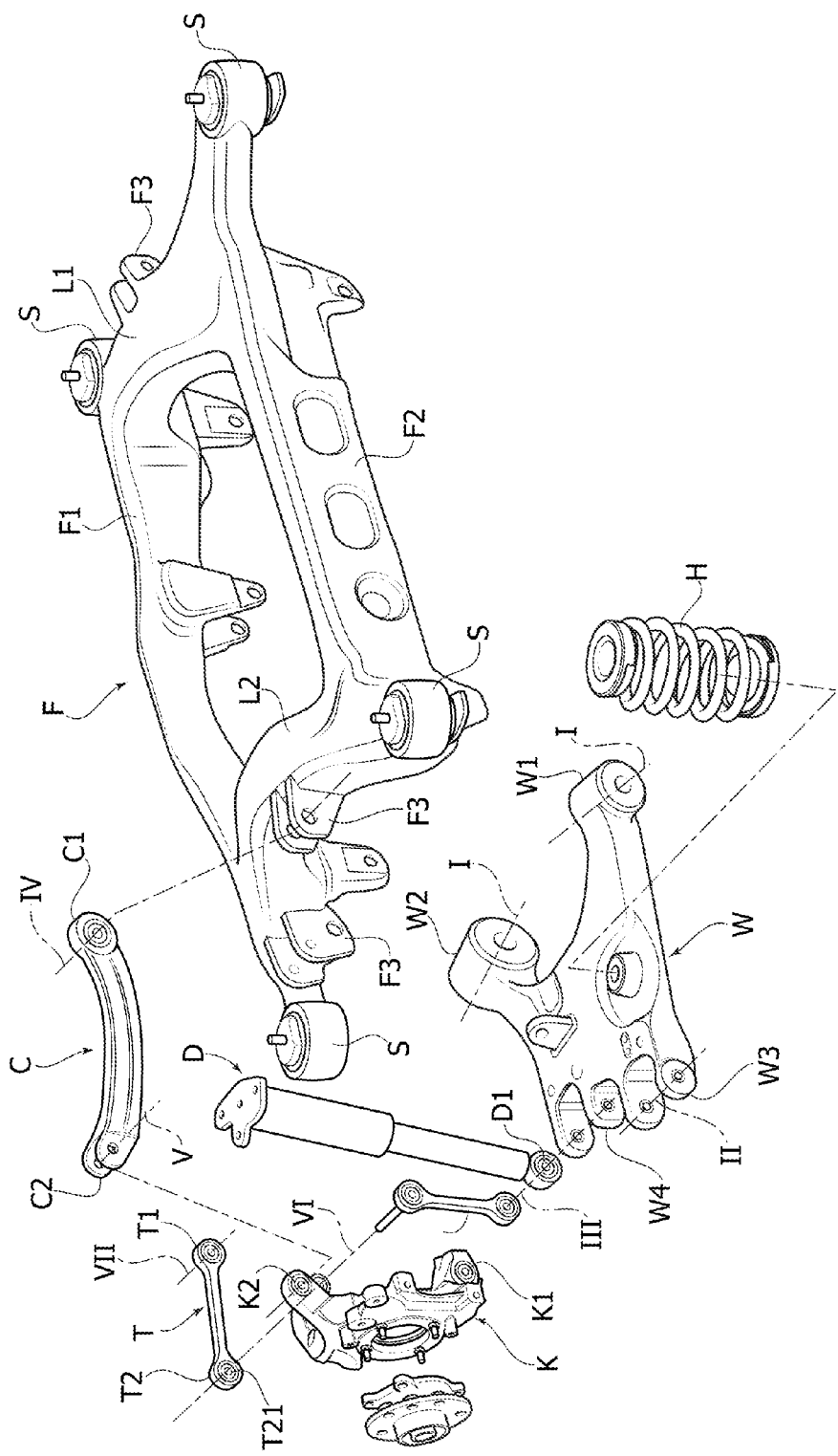
Figure 4:
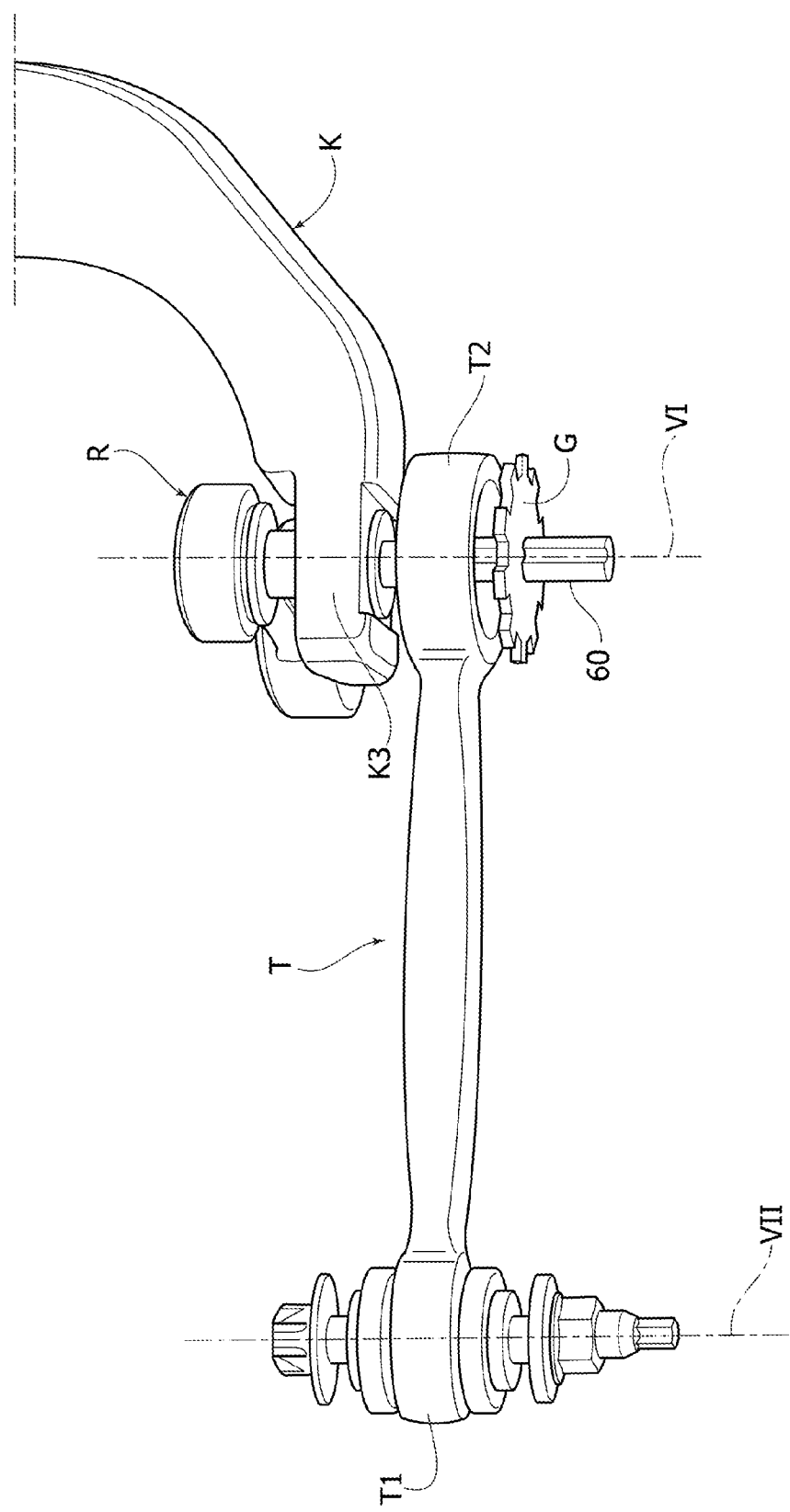
Figure 8:
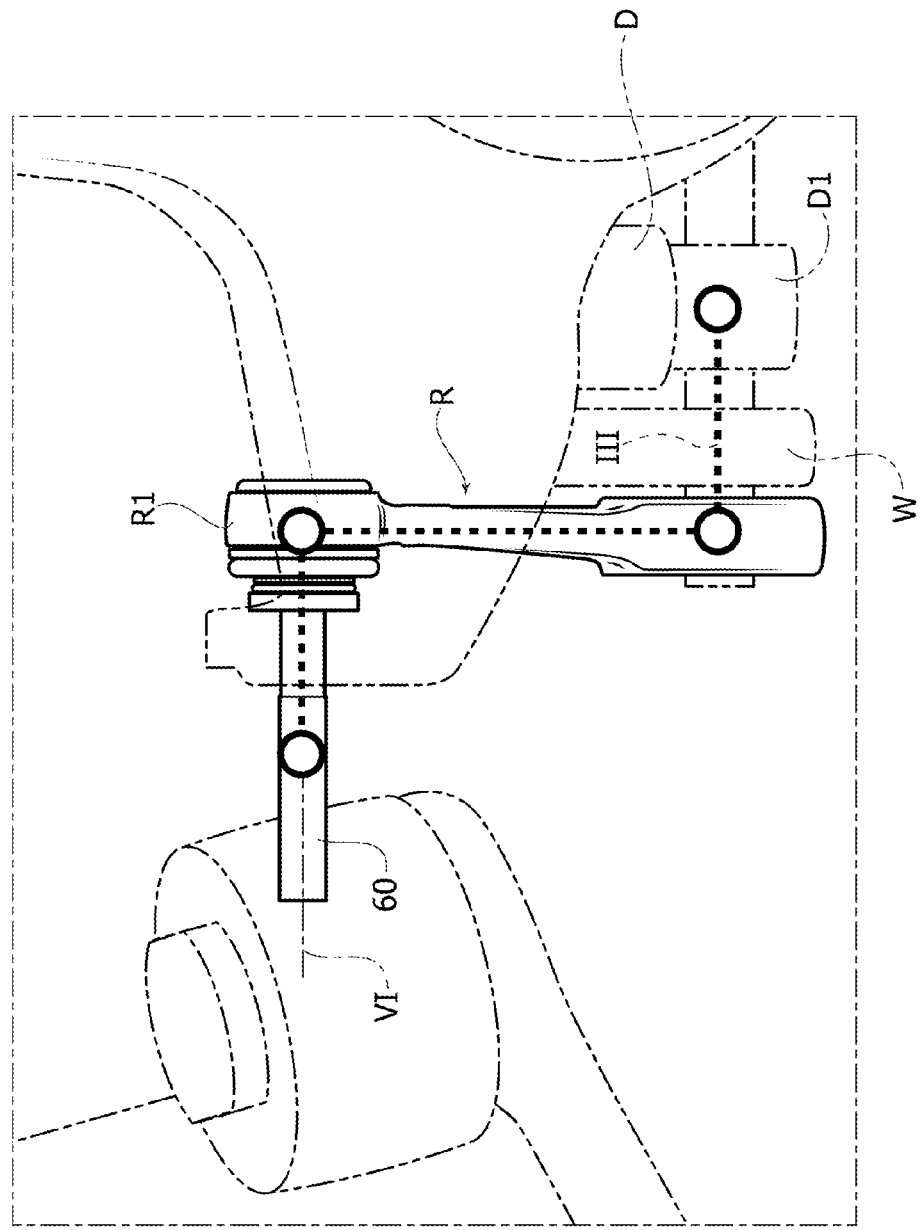

A further important advantage of the invention derives from that the lower end of the vertical rod R is pivotally connected to the outer end of the lower oscillating arm W around the same articulation axis III around which the lower end D1 of the damper unit D is also articulated, as well as because the above mentioned articulation axle 60 for the articulation of the outer end of the toe control rod T, the upper end of the vertical rod R and the connecting portion K3 of support K, is rigidly connected to the vertical rod R (FIG. 8). This arrangement provides the further advantage of obtaining a relatively reduced axial bulk of the unit associated to the articulation axis VI. As a result, the toe control rod T can be arranged in a position located more rearwardly (with reference to the direction of movement of the motor-vehicle). As a consequence, also the support S (FIG. 1) of frame F which is more adjacent to the toe control rod T can be positioned more rearwardly, which provides an increase in the space available in the transverse direction for the rear seat of the motor-vehicle.

Naturally, while the principle of the invention remains the same, the details of construction and the embodiments may widely vary with respect to what has been described and illustrated purely by way of example, without departing from the scope of the present invention.

What is claimed is:

1. A motor-vehicle wheel suspension, comprising a wheel support connected to a motor-vehicle supporting structure by at least the following connecting elements:
 a lower oscillating arm, having an inner end pivotally connected to said supporting structure around a first articulation axis and an outer end pivotally connected to the wheel support around a second articulation axis,
 a damper unit having a lower end pivotally connected to the lower oscillating arm around a third articulation axis, and an upper end connected in an articulated manner to a motor-vehicle structure,
 an upper oscillating rod for camber control, having opposite ends articulated to the supporting structure and the wheel support respectively around fourth and fifth articulation axes,
 a vertical articulated rod having an upper end pivotally connected to the wheel support around a sixth articulation axis and a lower end pivotally connected to the outer end of the lower oscillating arm,
 an oscillating toe rod for toe control which has an inner end pivotally connected to said supporting structure around a seventh articulation axis and an outer end which is pivotally connected to the wheel support,
 the lower end of the vertical rod pivotally connected to the outer end of the lower oscillating arm around said third articulation axis, around which the lower end of the damper unit is also articulated,
 the outer end of said toe rod is pivotally connected to the wheel support around said sixth articulation axis, around which the upper end of said vertical rod is also articulated,
 the articulation of the outer end of said toe rod to the wheel support and to the upper end of said vertical rod comprises:
  an articulation axle rigidly connected to said upper end of the vertical rod and projecting axially in cantilever fashion therefrom,
  a cylindrical cavity formed in the outer end of said toe rod which rotatably receives therein said articulation axle, for articulation of said toe rod around said articulation axle,
  an eccentric cylindrical member rigidly connected to said articulation axle and rotatably mounted within a cylindrical cavity formed in said wheel support and having an axis which is eccentric with respect to said articulation axle, and
  an adjustment ring rigidly connected to said articulation axle,
 in such a way that an angular adjustment of said ring determines a change of position of the wheel support which causes a variation of a toe angle of the wheel, without modifying the position of said seventh articulation axis of the toe rod to the supporting structure and without modifying the distance between said sixth and seventh axes around which the opposite ends of said toe rod are articulated.

2. Motor-vehicle wheel suspension according to claim 1, wherein said supporting structure comprises an auxiliary frame secured to the motor-vehicle body and comprising two cross-members connected to each other by two longitudinal arms, said auxiliary frame comprising a plurality of connecting portions for connection to the motor-vehicle body with the interposition of elastic supports, and said longitudinal arms bear connecting portions for the pivotal connection of the inner ends of said lower oscillating arm, said camber rod and said toe rod.

3. Motor-vehicle wheel suspension according to claim 1, further comprising a torsion rod rotatably supported around a transverse axis by means of supports secured to said supporting structure and having end arms each connected to a respective lower oscillating arm with the interposition of a connecting rod having ends respectively articulated to the respective end arm of the torsion rod and to said lower oscillating arm.

4. Motor-vehicle wheel suspension according to claim 1, further comprising a helical spring arranged spaced apart from said damper unit and having a lower end resting on said lower oscillating arm and an upper end adapted to engage a support of the motor-vehicle structure.

5. Motor-vehicle wheel suspension according to claim 1, wherein said lower oscillating arm has a pair of connecting portions provided with elastic bushings for articulation on said supporting structure around said first articulation axis.

6. Motor-vehicle wheel suspension according to claim 1, wherein said lower oscillating arm has a connecting portion at its outer end, for pivotal connection of the lower end of the damper unit and of the lower end of said vertical rod.

* * * * *